United States Patent
Kato et al.

(10) Patent No.: US 6,759,565 B1
(45) Date of Patent: Jul. 6, 2004

(54) METHOD FOR DECOMPOSING CHLORINE-CONTAINING ORGANIC COMPOUND CONTAINED IN EXHAUST GAS AND CATALYST FOR USE IN THE METHOD

(75) Inventors: Yasuyoshi Kato, Kure (JP); Masatoshi Fujisawa, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/130,155

(22) PCT Filed: Nov. 10, 2000

(86) PCT No.: PCT/JP00/07935
§ 371 (c)(1),
(2), (4) Date: Aug. 13, 2002

(87) PCT Pub. No.: WO01/36070
PCT Pub. Date: May 25, 2001

(30) Foreign Application Priority Data

Nov. 12, 1999 (JP) .............................................. 11/323043
Nov. 12, 1999 (JP) .............................................. 11/323064

(51) Int. Cl.$^7$ ................................................. A62D 3/00
(52) U.S. Cl. .................... 588/206; 423/240 S; 588/207
(58) Field of Search ....................... 423/99, 235, 240 S, 423/240 R; 588/206, 207

(56) References Cited

U.S. PATENT DOCUMENTS 5,009,869 A * 4/1991 Weinberg et al. ........... 423/210
5,290,432 A * 3/1994 Friedman et al. ......... 208/262.5
5,430,231 A * 7/1995 Wlassics et al. ............ 588/206

* cited by examiner

*Primary Examiner*—Stanley S. Silverman
*Assistant Examiner*—Edward M. Johnson
(74) *Attorney, Agent, or Firm*—Fay, Sharpe, Fagan, Minnich & McKee, LLP (57) ABSTRACT

The invention is to provide (1) a method for decomposing chlorine containing organic compounds (DXNs) contained in an exhaust gas in which method a high decomposition ratio of the DXNs can be obtained even at a low temperature and the effects by SOx can be repressed to a minimum and (2) a method for treating a used catalyst;

the method for decomposing DXNs contained in an exhaust gas comprises contacting the DXNs contained in the exhaust gas with nitrogen dioxide ($NO_2$) which is contained in the exhaust gas or added from the outside into the exhaust gas at 100 to 450° C. in the presence of a catalyst comprising a titanium oxideu, molybdenum oxide, and vanadium oxide, the contents of Ti, Mo, and V in which catalyst being in the range of 99 to 70/0.5 to 15/0.5 to 15 in terms of atomic ratio, respectively, to oxidatively decompose the DXNs with the nitrogen dioxide; and acocording to the method for treating a used catalyst, the DXNs adhered to the catalyst can be made innoxious by contacting the used catalyst with a gas containing $NO_2$ to oxidatively decompose the $DXN_2$ adhered to the catalyst, with the $NO_2$.

6 Claims, 2 Drawing Sheets

METHOD FOR DECOMPOSING CHLORINE-CONTAINING ORGANIC COMPOUND CONTAINED IN EXHAUST GAS AND CATALYST FOR USE IN THE METHOD

TECHNICAL FIELD

The present invention relates to a method for decomposing a chlorine containing organic compound contained in an exhaust gas and a catalyst used for the method. More specifically, the present invention relates to a method for decomposing a chlorine containing organic compound contained in an exhaust gas in which method a chlorine containing organic compound, which is typified by dioxin contained in an exhaust gas from a refuse incinerator, can efficiently be decomposed even at a low temperature, and relates to a catalyst used for the method.

BACKGROUND ART

In recent years, a minute quantity of chlorine containing organic compounds possessing an extremely strong toxicity, for example, dioxins such as polychlorinated dibenzodioxins and polychlorinated dizenzofurans, and copulaner PCB (polychlorinated biphenyls) (hereinafter the compounds are sometimes referred to as DXNS), in addition to poisonous substances such as nitrogen oxides (NOx), sulfur oxides (SOx), and hydrogen chloride (HCl) are contained in exhaust gases from incinerators burning municipal refuses or industrial wastes. Thus, it is desired to establish technology for removing those compounds, as environmental contaminants. Further, it has lately come to be known that DXNs act as endocrine disruptors (the so-called environmental hormones) and that the DXNs are accumulated in breast milks up to a high concentration and adversely affect to newborn children. Thus, emission control for DXNs is being further strengthened. Accordingly, the importance of the technology for reducing the contents of DXNs in exhaust gases is more increased and various researches and developments are being carried out in many fields.

As the technology for decomposing DXNs contained in exhaust gases, thermal decomposition methods in the presence of a catalyst, oxidative decomposition methods with oxygen, and a method in which the activity for decomposing DXNs is promoted by adding ozone or hydrogen peroxide (Laid-open Japanese Patent Publication No. Hei 7-75720) are known. Among them, catalytic decomposition methods such as the thermal decomposition methods conducted in the presence of a catalyst and oxidative decomposition methods with oxygen are becoming mainstreams. Especially, commercialization of the oxydative decomposition methods with oxygen are widely being planned since the oxidative decomposition methods are not only high in the performance of decomposing DXNs but also have a capability of denitrating DXNs in addition.

Decomposition reaction of DXNs contained in exhaust gases by the thermal decomposition or oxidative decomposition with oxygen described above proceeds according to the following equation (1) or (2), respectively:

Thermal decomposition reaction R—Cl (chlorine containing organic compound)→$mH_2+nC+pHCl+R'$—Cl (1)

Oxidative decomposition reaction with oxygen R—Cl (chlorine containing organic compound)+$kO_2$→$mCO_2+nH_2O+pHCl$ (2)

wherein m, n, p, and k are integers, and R and R' represent skeletons of hydrocarbons.

DISCLOSURE OF THE INVENTION

As a result of the investigations conducted by the present inventors, it has first been found that there exists such a problem as the rate of the thermal decomposition reaction of the equation (1) described above is slow and thus a large quantity of a catalyst and a high temperature are required in order to obtain a performance necessary for commercially adopting the reaction. Also, it has been found that a rate of the oxidative decomposition reaction commercially adoptable can not be obtained whereas the rate of the oxidative decomposition reaction of the equation (2) with oxygen is higher than that of the thermal decomposition described above, and that a catalyst is deteriorated when SOx are contained in an exhaust gas.

An object of the present invention is to provide a method for decomposing a chlorine containing organic compound contained in an exhaust in which method a high decomposition ratio of dioxins can be obtained even at a low temperature, the amount of a catalyst to obtain a performance or capability necessary for commercially adopting the decomposition method can be reduced, and the effects by the SOx can be suppressed down to a minimum, and to provide a catalyst used for the method.

Another object of the present invention is to provide a method for treating a catalyst which was used for decomposing chlorine containing organic compounds (DXNs) (hereinafter a catalyst already used for decomposing DXNs contained in an exhaust gas to purify the gas is sometimes referred to as a used catalyst). More specifically, another object of the present invention is to provide a method in which the DXNs adhered to a used catalyst can efficiently be decomposed and removed, and after which method was completed, safe working conditions at the time of conducting routine checkups of or taking out a used catalyst can be secured and a used catalyst can safely and readily be dumped or recycled.

In order to achieve the objects described above, various studies were conducted by the present inventors on thermal decomposition methods of DXNs in the presence of a conventional catalyst and on oxidative decomposition methods of DXNs with oxygen to find that the thermal or oxidative decomposition methods have the following problems:

That is, first, a high reaction rate of decomposing dioxins can not be obtained unless a temperature at which the catalytic reactions are initiated is high and the reactions are conducted at a high temperature. Especially, the thermal decomposition reaction is slow in reaction rate, and a reaction rate commercially adoptable can not be obtained unless the reaction temperature is as high as 300° C. or higher. Whereas a decomposition ratio of DXNs can be increased if the reaction temperature was raised, a re-synthesis reaction of dioxins from hydrocarbons, carbon monoxide (CO), chlorine compounds and others contained in an exhaust gas, and a polychlorination (isomerization) reaction having a higher toxicity proceed, leading to the generation of dioxins as opposed to the intention of reducing an amount of dioxins.

Second, the use of a large quantity of a catalyst is necessary since both the thermal decomposition reaction and oxidative decomposition reaction with oxygen are slow in reaction rate. It becomes a heavy burden, to small and medium sized municipalities operating refuse incinerators, to use a large quantity of an expensive catalyst. Moreover, when the amount of a catalyst is increased, a risk of generating dioxins tends to increase. That is when a catalyst exists in an exhaust gas, the increase in the amount of the catalyst apparently causes an increase of decomposition ratio of dioxins, since the thermal decomposition or oxidative decomposition reaction with oxygen, and such a re-synthesis reaction of DXNs as described above occur at the same time, the rate of the decomposition reaction is higher than that of the re-synthesis reaction, and thus the differential rate between both reactions becomes the amount of dioxins to be reduced. On the other hand, however, a risk that dioxins are re-synthesized increases, and there exists a risk that large quantities of dioxins are generated when the catalyst was deteriorated.

Third, a problem that decomposition ratio of dioxins is likely to be affected by sulfur oxides (SOx) contained in an exhaust gas can be mentioned. That is, generation of SOx at the time of burning refuses or industrial wastes is inevitable. Especially, a catalyst tends lately to be used at a lower temperature in order to avoid the re-synthesis of dioxins described above, deterioration of the catalyst by SOx becomes more remarkable at such a low temperature region, and thus it is not easy to obtain a high dioxins decomposition ratio according to conventional technology in which sufficient countermeasures against SOx are not taken.

Accordingly, diligent investigations were further carried out by the present inventors on conditions for efficiently decompose DXNs contained in exhaust gases to make them innoxious, and on a catalyst to be used at that time, based on some knowledge obtained by the studies in the early stage described above. As a result of the diligent investigations, first, the nitrogen oxides, particularly $NO_2$ usually contained in exhaust gases together with DXNs received attention, and then it was found that it is adequate for achieving an object of the present invention to oxidatively decompose DXNs by using the $NO_2$ contained in an exhaust gas, or by using the NOx added anew into an exhaust gas. Also, with respect to another object of the present invention, it was found that DXNs adhered to a catalyst can be decomposed by contacting a used catalyst with a gas containing NOx, and further that decomposition of DXNs can be accelerated by making a specific catalyst comprising a titanium oxide, molybdenum oxide, and vanadium oxide be present at that time. These discoveries led to the achievements of the present invention.

The present invention is summarized as follows:

(1) A method for decomposing a chlorine containing organic compound contained in an exhaust gas comprising reacting the chlorine containing organic compound contained in the exhaust gas with nitrogen dioxide which is contained in the exhaust gas or added anew from the outside into the exhaust gas, at 100 to 450° in the presence of a catalyst such that the concentration of nitrogen dioxide in the exhaust gas after the termination of the reaction is higher than 1 ppm, to oxidatively decompose the chlorine containing organic compound with the nitrogen dioxide.

(2) The method for decomposing a chlorine containing organic compound contained in an exhaust gas recited in paragraph (1) above wherein the catalyst comprises a titanium oxide, molybdenum oxide, and vanadium oxide, the contents of titanium (Ti), molybdenum (Mo), and vanadium (V) in the catalyst being in the range of 99 to 70/0.5 to 15/0.5 to 15 in terms of atomic ratio, respectively.

(3) The method for decomposing a chlorine containing organic compound contained in an exhaust gas recited in paragraph (1) or (2) above wherein the exhaust gas contains a sulfur oxide.

(4) A method for decomposing a chlorine containing organic compound contained in an exhaust gas comprising introducing ammonia into the exhaust gas containing the chlorine containing organic compound and then contacting the exhaust gas with a catalyst comprising a titanium oxide, molybdenum oxide, and vanadium oxide the contents of titanium (Ti), molybdenum (Mo), and vanadium (V) in which catalyst being in the range of 99 to 70/0.5 to 15/0.5 to 15 in terms of atomic ratio, respectively, at 100 to 450° C. to oxidatively decompose the chlorine containing organic compound with nitrogen dioxide which is contained in the exhaust gas or added anew from the outside into the exhaust gas and concentration of which nitrogen dioxide is higher than that of the chlorine containing organic compound, and to decompose the nitrogen oxide with the ammonia such that the nitrogen oxide remains at a concentration of higher than 1 ppm.

(5) The method for decomposing a chlorine containing organic compound contained in an exhaust gas recited in paragraph (4) above wherein a part of the reaction for decomposing the nitrogen oxide with the ammonia is carried out in advance before the exhaust gas is contacted with the catalyst recited in paragraph (2) above.

(6) The method for decomposing a chlorine containing organic compound contained in an exhaust gas recited in paragraph (4) or (5) above wherein the exhaust gas contains a sulfur oxide.

(7) A catalyst used for the method recited in paragraph (1) or (4) above and comprising a titanium oxide, molybdenum oxide, and vanadium oxide, the contents of titanium (Ti), molybdenum (Mo), and vanadium (V) in the catalyst being in the range of 99 to 70/0.5 to 15/0.5 to 15 in terms of atomic ratio, respectively.

(8) A method for treating a catalyst used for decomposing a chlorine containing organic compound comprising contacting a catalyst which was used for purifying an exhaust gas containing a chlorine containing organic compound, with a gas containing nitrogen dioxide to oxidatively decompose the chlorine containing organic compound adhered to the catalyst, with the nitrogen dioxide.

(9) The method for treating a catalyst used for decomposing a chlorine containing organic compound recited in paragraph (8) above wherein the contact of the catalyst with the gas containing nitrogen dioxide is carried out at a temperature lower than 250° C.

(10) The method for treating a catalyst used for decomposing a chlorine containing organic compound recited in paragraph (8) or (9) above wherein the catalyst is contacted with the gas containing nitrogen dioxide after the dust adhered to the catalyst was removed by washing the catalyst in advance.

(11) The method for treating a catalyst used for decomposing a chlorine containing organic compound recited in paragraph (10) above wherein a waste water produced at the time of removing the dust in advance is heated to obtain steam (vapor), a gas containing nitrogen dioxide is added into the steam obtained from the waste water, and then the mixture of the gas with the steam is contacted with the catalyst.

(12) The method for treating a catalyst used for decomposing a chlorine containing organic compound recited in any one of paragraphs (8) to (11) above wherein the decomposition of the chlorine containing organic compound adhered to the catalyst, with nitrogen dioxide is carried out in an apparatus having the catalyst placed or disposed therein.

(13) The method for treating a catalyst used for decomposing a chlorine containing organic compound recited in any one of paragraphs (8) to (12) above wherein the catalyst comprises, as a main component, a titanium oxide and further comprises vanadium, and molybdenum or tungsten.

The method of the present invention is to oxidatively decompose chlorine containing organic compounds (DXNs) contained in an exhaust gas with nitrogen dioxide ($NO_2$) by reacting the nitrogen dioxide already contained in the exhaust gas or added from the outside anew to the exhaust gas with the chlorine containing organic compound in the presence of a catalyst having a specific chemical composition at a prescribed temperature such that the concentration of nitrogen dioxide in the exhaust gas after the reaction was terminated is higher than 1 ppm, preferably higher than 3 ppm.

The catalyst used in the present invention and having a specific chemical composition comprises, as essential components, titanium oxide ($TiO_2$), molybdenum oxide ($MoO_3$), and vanadium oxide ($V_2O_5$), and the mixing ratio of titanium (Ti), molybdenum (Mo), and vanadium (V) is in the range of 99 to 70/0.5 to 15/0.5 to 15 in terms of atomic ratio A catalyst comprising only titanium and vanadium exhibits a certain extent of the activity for decomposing DXNs with nitrogen dioxide. However, the activity of the catalyst for decomposing DXNs with nitrogen dioxide is considerably increased when molybdenum coexists in the catalyst. Further, when titanium, molybdenum, and vanadium coexist in a catalyst, lowering of the activity of the catalyst for decomposing DXNs with nitrogen dioxide under coexistence of SOx can be avoided and thus a high decomposition activity of the catalyst is obtained even at low temperature regions at which a remarkable deterioration of the catalyst with SOx is apt to occur. For instance, whereas the activity of a titanium-vanadium (Ti—V) or titanium-vanadium-tungsten (Ti—V—W) type catalyst for decomposing a halogen containing organic compound with oxygen at 200° C. is almost completely lost by the presence of 50 ppm of SOx, the activity of the three components catalyst of titanium-molybdenum-vanadium (Ti—Mo—V) of the present invention for decomposing the halogen containing organic compound with nitrogen dioxide is little reduced even if the same concentration of SOx existed.

Catalyst of the present invention is calcined in somewhere in the process for preparing the catalyst, at 300 to 650° C., preferably 400 to 600° C. When the calcination temperature is too low, organic compounds contained in the raw materials for the catalyst are not decomposed, formation of a complex through mutual mixing of the oxides becomes insufficient, and thus high catalyst performances can hardly be obtained. On the other hand, when the calcination temperature is too high, molybdenum oxide in a catalyst composition is sublimed, titanium oxide is sintered, and thus catalyst performances are deteriorated.

Catalyst of the present invention can be obtained through such a known method as a kneading method, impregnation method, and wash coating method by using, as raw materials, a titanium oxide obtained by one of various kind of such processes as a sulfuric acid process and chlorine process or a water-containing titanium oxide such as ortho- or meta-titanic acid, and oxides, ammonium salts, or mineral acid salts such as sulfuric acid salts of molybdenum or vanadium. Also, it is possible to add such an inorganic or organic bonding agent as inorganic fibers and colloidal silica in the process for preparing a catalyst to increase the strength of a molded catalyst. As to the shape of catalyst, a catalyst carried on a filter cloth of a bag filter, or on a particle-like or honeycomb-like carrier made of a ceramic in addition to a catalyst molded into particle-like, plate-like, or honeycomb-like can be mentioned.

In the present invention, a reaction in which DXNs in an exhaust gas are oxidatively decomposed with $NO_2$ is expressed as follows:

Oxidative decomposition reaction of a chlorine containing organic compound with $NO_2$ R—Cl (chlorine containing organic compound)+$kNO_2$→$mCO_2$+$nH_2O$+$pHCl$+$kNO$  (3)

wherein m, n, p, and k are integers, and R represents a hydrocarbon skeleton.

Reaction temperature is 100 to 450° C., preferably 120 to 250° C., and most desirably 120 to 200°C. The oxidative decomposition reaction of DXNs with $NO_2$ begins at about 120° C., and proceeds at a far low temperature compared with a thermal decomposition reaction and oxidation reaction with oxygen both of which belong to conventional technology. Reaction rate at a low temperature region lower than 250° C. is several times to several ten times as high as that in the conventional methods, and DXNs are efficiently decomposed even such a low temperature region. Although the re-synthesis temperature of dioxins is being said to be 250 to 350° C., dioxins can efficiently be decomposed according to the decomposition method using a catalyst of the present invention having an excellent activity at a low temperature while avoiding the re-synthesis temperature region of dioxin.

In the present invention, NO2 may be that which was added anew from the outside in addition to that already contained in an exhaust gas. Since the equilibrium between NO and $NO_2$ in the presence of oxygen at the reaction temperature region described above inclines to $NO_2$ side the NO contained in an exhaust gas is successively converted into $NO_2$, and thus the $NO_2$ may be that which was formed by oxidation of the NO contained in an exhaust gas. It is sufficient that the concentration of the NO2 is higher than that of DXNs.

Catalyst of the present invention also has an activity as a catalyst for reducing NOx contained in an exhaust gas with $NH_3$ in addition to the activity for decomposing DXNs. Accordingly, it is possible to perform the decomposition of DXNs and the decomposition of NOx at the same time or with the one being closely behind the other in the presence of one catalyst.

Explanation of the Symbols

1 . . . an exhaust gas generating source, 2 . . . a gas containing DXNs, 3 . . . an exhaust gas flue, 4 . . . a catalyst reactor, 5 . . . a catalyst of the present invention, 6 . . . a treated gas, 7 . . . a denitrating catalyst.

BEST MODE FOR CARRYING OUT THE INVENTION

Figure 1:
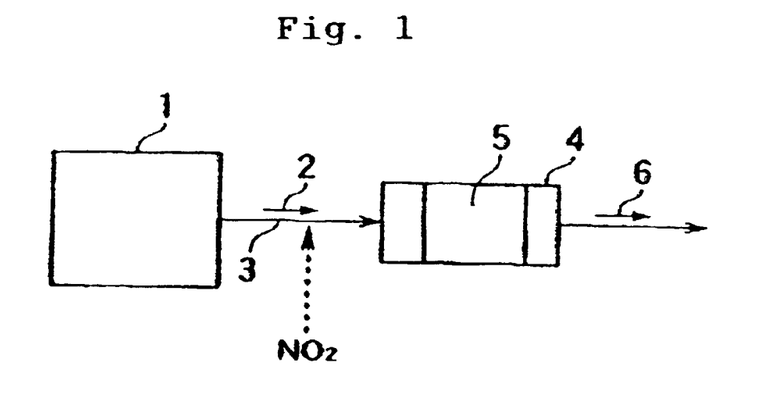
FIG. 1 is a schematic drawing illustrating an example of exhaust gas treating methods conducted in an apparatus according to the present invention.

FIG. 1 is a schematic drawing illustrating an example of exhaust gas treating methods conducted in an apparatus according to the present invention. In FIG. 1, exhaust gas 2 containing DXNs and generated in exhaust gas generating source 1 flows through exhaust gas flue 3 into catalyst reactor 4 in which catalyst 5 of the present invention is filled, after $NO_2$ was added to the exhaust gas 2, when necessary. Subsequently, the DXNs react here with the $NO_2$ which is already contained in the exhaust gas 2 or added anew thereto so that the DXNs are oxidatively decomposed with the $NO_2$. Exhaust gas 2 from which DXNs are removed flows out of the apparatus as treated gas 6.

Figure 2:
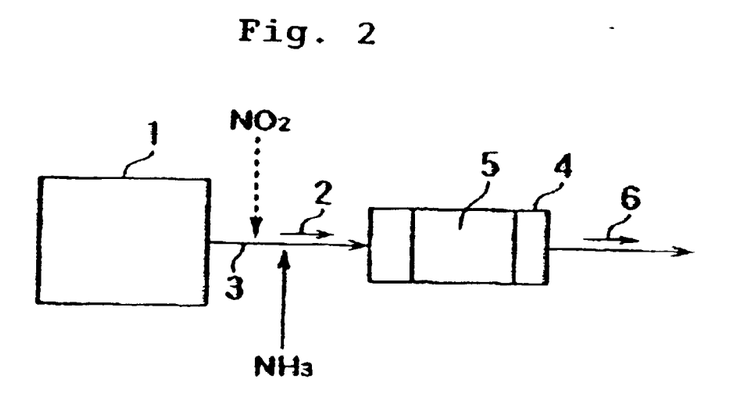
FIG. 2 is a schematic drawing illustrating another example of exhaust gas treating methods conducted in an apparatus according to the present invention.

FIG. 2 is a schematic drawing illustrating another example of exhaust gas treating methods conducted in an apparatus according to the present invention. In FIG. 2, exhaust gas 2 containing DXNs and generated in exhaust gas generating source 1 flows through exhaust gas flue 3 into catalyst reactor 4 which is positioned in the downstream of the exhaust gas generator 1 and in which catalyst 5 of the present invention is filled, after $NO_2$ was added to the exhaust gas 2, when necessary, and further an appropriate amount of $NH_3$ was added thereto. Subsequently, the DXNs react in the reactor 4 with $NO_2$ which is already contained in the exhaust gas 2 or added anew thereto so that the DXNs are oxidatively decomposed with the $NO_2$ and nitrogen oxides are decomposed into $N_2$ with $NH_3$.

Figure 3:
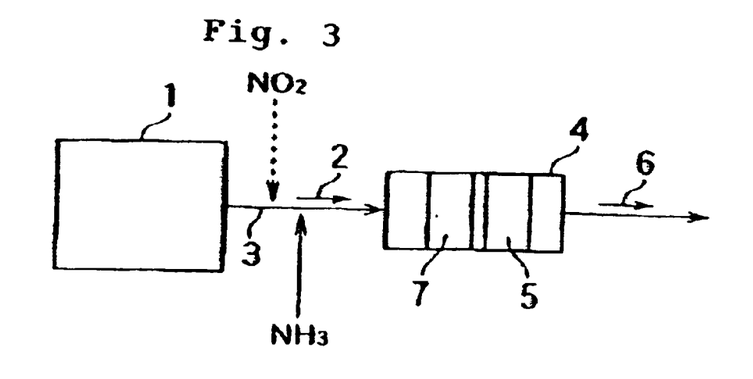
FIG. 3 is a schematic drawing illustrating a still another example of exhaust gas treating methods conducted in an apparatus according to the present invention.

FIG. 3 is a schematic drawing illustrating a still another example of exhaust gas treating methods conducted in an apparatus according to the present invention. In FIG. 3, exhaust gas 2 containing DXNs and generated in exhaust gas generating source 1 flows through exhaust gas flue 3 into catalyst reactor 4 in which known denitrating catalyst 7 and catalyst 5 of the present invention are filled in order, after $NO_2$ was added to the exhaust gas 2, when necessary, and further an appropriate amount of $NH_3$ was added thereto. Subsequently, a part of the NOx is decomposed into $N_2$ in the reactor 4 with $NH_3$ in the presence of denitration catalyst 7 and then the DXNs are oxidatively decomposed, on the catalyst 5 of the present invention with $NO_2$ which is already contained in the exhaust gas 2 or added anew thereto.

In FIGS. 2 and 3, $NO_2$ is used in both reaction with $NH_3$ and reaction with DXNs and the reactions become competitive with each other. Therefore, when the concentration of added $NH_3$ was excessively increased so that no NOx came to exist in the gas, decomposition reaction of DXNs comes not to proceed. Accordingly, it is preferable in the present invention to control reaction conditions so that NOx is detected at the outlet, not to mention the inlet, of the catalyst reactor. In the present invention, it is preferable to operate the apparatus under such conditions that the denitrating ratio does not reach 100% in order to make $NO_2$ exist at the outlet of the catalyst layers (reactor) by limiting the amount of $NH_3$ to be added for the denitrating reaction, since the present invention is to oxidatively decompose DXNs with the $NO_2$ contained or added in the exhaust gas, in the presence of the catalyst described above.

When more amount of $NO_2$ than that of DXNs exist, the oxidative decomposition reaction of DXNs with $NO_2$ (reaction of the equation (3) described above) proceeds in preference to the thermal decomposition reaction of the equation (1) and the oxidative decomposition reaction with oxygen, of the equation (2). Accordingly, the $NO_2$ contained already in an exhaust gas or added anew thereto in the method of the present invention assumes the role of preventing DXNs from being re-synthesized by the reaction reverse to that shown in the equations (1) or (2) described above.

Thus, when the concentration of NOx is higher than that of DXNs in an exhaust gas, it is preferable to use such an apparatus as shown in FIG. 2 or 3, and to carry out the oxidative decomposition of DXNs and the decomposition of NOx at the same time or with the one being closely behind the other.

When the concentration of NOx is lower than that of DXNs in an exhaust gas, the exhaust gas is treated by using such an apparatus as shown in FIG. 1 while adding NO2 to the apparatus.

Besides, denitrating activity of the catalyst is susceptible to the effect of the presence of SOx and the activity is largely lowered at low temperatures, but the decomposition reaction of DXNs with $NO_2$ is hardly susceptible to the effect of SOx. Accordingly, the present invention has such an advantage as the emission of dioxins having deadly serious toxicity can be prevented if the denitrating activity is being kept under monitoring.

Next, according to a method of the present invention for treating a catalyst, it is possible to contact a catalyst used for purifying an exhaust gas containing DXNs, with a gas containing nitrogen dioxide ($NO_2$) to oxidatively decompose the DXNs adhered to the catalyst with the $NO_2$ described above thereby converting the used catalyst into one which can safely be handled.

As used herein, the term "exhaust gas containing DXNs" means, for example, an exhaust gas generated when municipal refuses, industrial wastes, and the like were burnt, and specifically means an exhaust gas containing an organic chlorine compound such as a dioxin, for example, polychlorinated dibenzodioxines and polychlorinated dibenzofrans, and a coplanar PCB (polychlorinated biphenyl) all of which having an extremely strong toxicity.

$NO_2$ containing gas is not especially limited so far as the gas contains an amount of $NO_2$ sufficient to oxidatively decompose DXNs adhered to a used DXNs-decomposing catalyst.

Used catalyst is preferably contacted with a gas containing NO2 under a condition in which dusts adhered to the catalyst were removed in advance. Some of the DXNs remaining on the surface of a catalyst are adhered to the catalyst through dusts. On the other hand the DXNs remaining on the surface or within a catalyst after removal of dusts are in direct contact with the catalyst. Thus, the latter DXNs can readily be decomposed by contacting the catalyst with a $NO_2$ containing gas even at a low temperature region while employing the catalytic action. The former DXNs adhered to a catalyst through dusts are removed from the catalyst together with the dusts and then treated separately.

A method for removing dusts adhered to a catalyst is not especially limited, and various methods used at the time of regenerating a catalyst, for example, a flushing with water or fine particles, and washing with water or an acid can be employed.

A drain to be produced, for example, by the washing of a catalyst with water or an acid to remove dusts comes to a large volume and contains a very small quantity of DXNs. DXNs having a low boiling point are readily volatilized.

Thus, in the method for treating a catalyst described above, it is possible to heat a drain produced at the time of removing dusts to generate steam (vapor) and volatilize the DXNs into the steam at the same time, add a $NO_2$ containing gas also into the steam, and then contact the mixture of the steam and the gas with a used DXNs-decomposing catalyst to efficiently decompose even the DXNs once contained in the drain and then volatilized into the steam. A problem of additionally treating the drain does not arise. In this case, a small amount of dusts containing a trace quantity of DXNs are recovered.

The treatment described above for decomposing DXNs adhered to a catalyst can be carried out in a catalyst apparatus. As a method for removing dusts in this case, flushing of the catalyst with water or fine particles is preferably adopted.

A used catalyst has an activity for oxidatively decomposing DXNs. In order to efficiently make the used catalyst innoxious, it is preferable that the catalyst for decomposing DXNs comprises, as a main component, a titanium oxide, and further comprises vanadium, and molybdenum or tungsten. It is more preferable that the catalyst comprises particularly a titanium oxide, vanadium, and molybdenum.

The DXNs are decomposed by a thermal decomposition, oxidative decomposition with oxygen, or oxidative decomposition with another or other components contained in an exhaust gas. When the catalyst described above comprising, as a main component, a titanium oxide, and supporting oxides of metals such as vanadium, molybdenum, and tungsten was used, an oxidative decomposition reaction of DXNs with $NO_2$ expressed by the following equation (4) quickly proceeds:

$$\text{DXNs (chlorine containing organic compounds)} + kNO_2 \rightarrow mCO_2 + nH_2O + pHCl + kNO \quad (4)$$

wherein m, n, p, and k are integers.

The reaction described above begins to proceed at a low temperature compared with a thermal decomposition reaction and an oxidative decomposition reaction with oxygen, and the rate of the reaction (4) suddenly increases at about 120° C. Accordingly, the treatment temperature at the time of contacting a $NO_2$ containing gas with a used catalyst to decompose the DXNs adhered to the catalyst is preferably higher than 120° C., and preferably lower than 250° C. in order to prevent re-synthesis of decomposed DXNs. When the temperature for the treatment is in this region, the reaction rate is high, a catalyst can be treated in a short period of time, and besides there is not such a fear as DXNs once decomposed are re-synthesized.

In the method described above, when the decomposition of nitrogen oxides, that is, a denitrating reaction accompanies at the time of making a used catalyst innoxious by contacting the used catalyst with a $NO_2$ containing gas, it is preferable to contact the used catalyst with a gas additionally containing an extra amount of $NO_2$ corresponding to the amount of $NO_2$ to be consumed, since $NO_2$ is consumed by the denitrating reaction. Accordingly, it is preferable, in the method described above, to control the reaction such that $NO_2$ remains in the gas after the contact with a used catalyst was terminated.

Now, the present invention is described in more detail with reference to specific Examples. However, it should be understood that the scope of the present invention is by no means restricted by such specific Examples.

EXAMPLE 1

Water was added to a mixture of ammonium metavanadate, ammonium molybdate, and powders of a titanium oxide, and kneaded with a kneader to prepare a paste of a catalyst having a chemical composition of Ti/Mo/V=88/5/7 in terms of atomic ratio. On the other hand, net-like products prepared by plain weaving twisted yarns each comprising 1400 E-glass fibers having a diameter of 9 μm at a roughness of 10 yarns/25.4 mm were impregnated with a slurry containing a titania, silica sol, and polyvinyl alcohol to impart a stiffness thereby obtaining catalyst substrates. The catalyst paste described above was placed between two sheets of the catalyst substrates obtained by the procedures described above, and they were passed through pressure rolls, subjected to an air-drying in an atmosphere for 12 hours, and then calcined at 500° C. for 2 hours to obtain a platelike catalyst (100 mm×100 mm) having a thickness of 1.0 mm.

The catalyst thus obtained was cut into strips of 20 mm×100 mm, three sheets of the strips were filled in a reaction tube to form catalyst layers, and then the catalyst was contacted with a quasi exhaust gas containing 8 ppm of dichlorobenzene as a quasi substance for chlorine containing organic compounds (or DXNs) and 200 ppm of $NO_2$ at a reaction temperature of 180° C. at an areal velocity of 10 m/h as shown in Table 1. Decomposition ratio of the dichlorobenzene was determined by calculation from its concentrations at the inlet and the outlet of the catalyst layers to be 87%.

TABLE 1

| Areal velocity | 10 m/h |
|---|---|
| Reaction temperature | 180° C. |
| Gas composition | |
| Dichlorobenzene | 8 ppm |
| $NO_2$ | 200 ppm |
| $N_2$ | The remainder |

COMPARATIVE EXAMPLE 1

Decomposition test of dichlorobenzene was conducted in the same method and by using the same catalyst as in the Example 1 described above with the exception that the chemical composition of the exhaust gas was changed to that which contained 10% of oxygen instead of 200 ppm of $NO_2$ as shown in Table 2, and the ratio of decomposition of dichlorobenzene with oxygen was determined to be 45%.

TABLE 2

| Areal velocity | 10 m/h |
|---|---|
| Reaction temperature | 180° C. |
| Gas composition | |
| Dichlorobenzene | 8 ppm |
| $O_2$ | 10% |
| $N_2$ | The remainder |

COMPARATIVE EXAMPLE 2

Decomposition test of dichlorobenzene was conducted in the same method and by using the same catalyst as in the Example 1 with the exception that the chemical composition of the exhaust gas was changed to that in which neither $NO_2$ nor oxygen coexisted as shown in Table 3, and the ratio of thermal decomposition of dichlorobenzene was determined to be 11%.

TABLE 3

| Areal velocity | 10 m/h |
|---|---|
| Reaction temperature | 180° C. |
| Gas composition | |
| Dichlorobenzene | 8 ppm |
| $N_2$ | The remainder |

EXAMPLE 2

Decomposition ratio of dichlorobenzene was determined in the same method and by using the same catalyst as in the Example 1 with the exception that the chemical composition of the exhaust gas was changed to that in which 8 ppm of dichlorobenzene, 200 ppm of $NO_2$, 10% of oxygen, and 10% of $H_2O$ coexisted as shown in Table 4. The result thus obtained was 85%. To an accompaniment of the determination of the decomposition ratio of dichlorobenzene, the concentrations of $CO_2$, CO, $NO_2$, and NO at the outlet of the catalyst layers were determined, the oxygen balance and carbon balance shown in the equations (1) to (3) described above were calculated from the values thus determined, and then the ratio of the reactions of the equations (1) to (3) occurred in this Example were further calculated. As the result, it was found that the reaction of equation (1) occurred at a ratio of 0.5% the reaction of equation (2) 3% and the reaction of equation (3) 96.5%.

TABLE 4

| | |
|---|---|
| Areal velocity | 10 m/h |
| Reaction temperature | 180° C. |
| Gas composition | |
| Dichlorobenzene | 8 ppm |
| $NO_2$ | 200 ppm |
| $O_2$ | 10% |
| $H_2O$ | 10% |
| $N_2$ | The remainder |

EXAMPLES 3 AND 4

The same platelike catalysts (catalyst test pieces) (100× 100 mm) as those used in the Examples 1 and 2 were exposed for 500 hours to an exhaust gas which was produced from a light oil combustion gas and in which 50 ppm of $SO_2$ was added. The catalyst test pieces exposed to the gas were cut into strips of 20 mm×100 mm. Subsequently, the decomposition ratios of dichlorobenzene were determined in the same methods as in the Examples 1 and 2 with the exception that the catalysts exposed to the $SO_2$ were used. The results thus obtained were 83% and 82% respectively.

Further, in Example 4, the ratios of the reactions of equations (1) to (3) described above were calculated in the same manner as in the Example 2 to find that the reaction of equation (1) occurred at a ratio of lower than 0.1%, reaction of equation (2) 2%, and reaction of equation (3) higher than 98%.

COMPARATIVE EXAMPLES 3 AND 4

The same platelike catalysts (catalyst test pieces) (100× 100 mm) as those used in the Comparative Examples 1 and 2 were exposed for 500 hours to an exhaust gas which was produced from a light oil combustion gas and in which 50 ppm of $SO_2$ was added. The catalyst test pieces exposed to the gas were cut into strips of 20 mm×100 mm. Subsequently, the decomposition ratios of dichlorobenzene were determined in the same methods as in the Comparative Examples 1 and 2 with the exception that the catalysts exposed to the $SO_2$ were used. The results thus obtained were 14% and 3%, respectively.

Decomposition ratios of dichlorobenzene in the Examples 1 to 4 and Comparative Examples 1 to 4 are collectively shown in Table 5.

TABLE 5

| | Decomposition ratio of dichlorobenzene (%) | |
|---|---|---|
| Test conditions | Prior to exposure to $SO_2$ containing gas | After exposure to $SO_2$ containing gas |
| Examples 1 and 3 | 87 | 83 |
| Examples 2 and 4 | 85 | 82 |
| Comparative Examples 1 and 3 | 45 | 14 |
| Comparative Examples 2 and 4 | 11 | 3 |

As will clearly be understood from Table 5, in the system in which $NO_2$ exists as in the case of Examples 1 and 2, an extremely high activity for decomposing dichlorobenzene is obtained. On the other hand, the performance of the catalyst for decomposing dichlobenzene is remarkably low in the system in which O2 existed in place of $NO_2$ (Comparative Example 1), and the performance of the catalyst for decomposing dichlorobenzene in the system in which neither $NO_2$ nor $O_2$ existed so as to examine the activity only by thermal decomposition (Comparative Example 2) was almost close to 0.

From these facts, it can be understood that when $NO_2$ was made to exist as in the method of the present invention, oxidative decomposition reaction of DXNs (reaction of the equation (3) described above) efficiently proceeds regardless of the presence or absence of oxygen.

Besides, when viewed the decomposition ratios of dichlorobenzene in the case of "After exposure to $SO_2$ containing gas" in Table 5, it can be understood that whereas the decomposition ratio of dichlorobenzene by the oxidation reaction with oxygen in the Comparative Example 3 or by the thermal decomposition in the Comparative Example 4 considerably lowered, the decomposition ratios of dichlorobenzene in the Examples 3 and 4 little reduced, and thus that the catalyst of the present invention is excellent as catalyst for decomposing DXNs with $NO_2$.

Table 6 shows the ratios of reactions of the equations (1) to (3) described above occurred in Examples 2 and 4, respectively.

TABLE 6

| | Ratio of occurrence (%) | |
|---|---|---|
| Reaction | Example 2 | Example 4 |
| Reaction of equation (1) | 0.5 | Lower than 0.1 |
| Reaction of equation (2) | 3 | 2 |
| Reaction of equation (3) | 96.5 | Higher than 98 |

As will clearly be understood from Table 6, dichlorobenzene is preferentially oxidatively decomposed with $NO_2$ when several hundreds ppm of $NO_2$ exist even in a system in which 10% of oxygen exist. This tendency remarkably appears in the case where a catalyst exposed to an $SO_2$ containing gas was used (Example 4), and both ratios of thermal decomposition, and oxidative decomposition with oxygen became lower than those in the Example 2. From this fact, it can be understood that the catalyst of the present invention is extremely advantageous for oxidatively decomposing DXNs with $NO_2$ even with such exhaust gases as those generated from refuse incinerators and containing not only dioxins but also SOx.

EXAMPLES 5 THROUGH 14

In order to observe the effects of the chemical composition in the catalyst used in the Example 1, catalysts each having a chemical composition of Ti/Mo/V=(95-α)/5/α (wherein α=0.5, 4, 7, 10, or 15) or Ti/Mo/V=(95-β)/β/4 (wherein β=0.5, 4, 7, 10, or 15) were prepared.

COMPARATIVE EXAMPLE 5

A catalyst was prepared by the same method as that in the Example 1 with the exception that ammonium molybdate was not added.

COMPARATIVE EXAMPLES 6 THROUGH 8

Catalysts were prepared in the same method as in Example 1 with the exception that manganese nitrate (Mn$(NO_3)_2$), cerium nitrate (Ce$(NO_3)_2$), or copper nitrate (Cu$(NO_3)_2$), each in the same molar amount as that of ammonium molybdate in the Example 1 was used in place of the molybdate.

TESTS FOR THE CATALYSTS OF EXAMPLES 5 THROUGH 14 AND COMPARATIVE EXAMPLES 5 THROUGH 8

Decomposition ratios of chlorobenzene were determined by using the same catalysts as those of the Examples 5 through 14 and Comparative Examples 5 through 8, respectively, as they are, or after exposed to an $SO_2$ containing gas for 500 hours as in the case of the Example 4 under the same conditions as in the Example 4, with the exception that the "dichlorobenzene" included within the conditions shown in Table 4 was changed to chlorobenzene. The results thus obtained are shown in Table 7.

TABLE 7

| Catalyst | Chemical composition of catalyst | Decomposition ratio of chlorobenzene (%) | |
|---|---|---|---|
| | | Prior to exposure to $SO_2$ | After exposure to $SO_2$ |
| Example 5 | Ti/Mo/V = 94.5/5/0.5 | 32 | 31 |
| Example 6 | Ti/Mo/V = 91/5/4 | 68 | 65 |
| Example 7 | Ti/Mo/V = 88/5/7 | 85 | 82 |
| Example 8 | Ti/Mo/V = 85/5/10 | 88 | 83 |
| Example 9 | Ti/Mo/V = 80/5/15 | 88 | 80 |
| Example 10 | Ti/Mo/V = 95.5/0.5/4 | 64 | 32 |
| Example 11 | Ti/Mo/V = 91/5/4 | 68 | 65 |
| Example 12 | Ti/Mo/V = 89/7/4 | 71 | 71 |
| Example 13 | Ti/Mo/V = 86/10/4 | 78 | 77 |
| Example 14 | Ti/Mo/V = 81/15/4 | 71 | 78 |
| Comparative Example 5 | Ti/V = 96/4 | 46 | 7 |
| Comparative Example 6 | Ti/Mn/V = 91/5/4 | 48 | 11 |
| Comparative Example 7 | Ti/Ce/V = 91/5/4 | 45 | 5 |
| Comparative Example 8 | Ti/Cu/V = 91/5/4 | 42 | 3 |

In Table 7, when catalyst performances were compared between Examples and Comparative Examples, it can be understood that catalysts of Examples are remarkably high in the performances and extremely small in deterioration by $SO_2$. From this fact, it can be found that three of the Ti, Mo, and V exert their effects in combination in the decomposition of DXNs with $NO_2$. Further, it can be understood that the resistance to $SO_2$ is remarkably increased in the range of Mo content of 5 to 15% in terms of atomic ratio, and that V content of 4 to 15% in terms of atomic ratio is suitable to obtain a high DXNs decomposition ratio.

EXAMPLES 15 AND 16

Decomposition ratios of dichlorobenzene were determined in the same method as in the Examples 2 and 4 with the exception that reaction temperature was varied in the range of 120 to 400° C., respectively, to find the variation in the decomposition ratio.

COMPARATIVE EXAMPLES 9 AND 10

Decomposition ratios of dichlorobenzene were determined in the same method as in the Comparative Examples 3 and 4 with the exception that reaction temperature was varied in the range of 120 to 400° C., respectively, to find the variation in the decomposition ratio.

Figure 4:
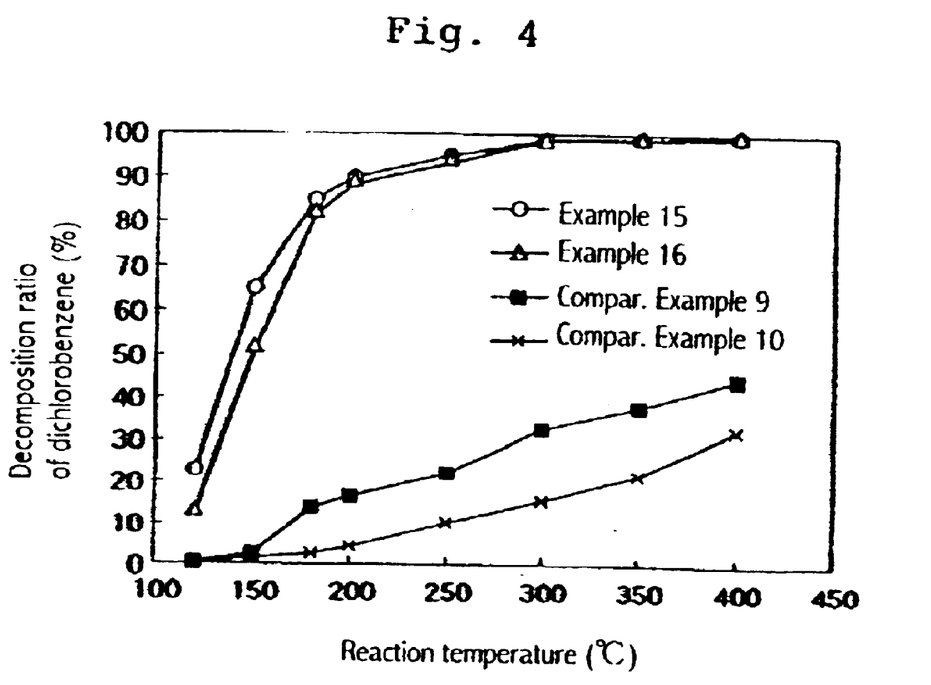
FIG. 4 is a graph showing a comparison of the activity for decomposing a chlorine containing organic compound in the reaction, between the present invention and a conventional technology.

Results obtained in Examples 15 and 16, and Comparative Examples 9 and 10 are collectively shown in FIG. 4.

As will be clear from FIG. 4, the catalysts of the present invention are not poisoned by $SO_2$ and have an extremely high activity even at a low temperature, and thus it can be understood that the catalysts of the present invention are suitable for decomposing dioxins contained in exhaust gases from refuse incinerators and the like.

EXAMPLE 17

In order to simulate a case in which an oxidative decomposition reaction of DXNs with $NO_2$ and a reductive decomposition reaction of NOx with $NH_3$ in the presence of the same catalyst as used in the Example 1 are carried out at the same time, three sheets of the same catalyst as those used in the Example 1 in the form of strips cut into 20 mm×100 mm were filled in a reaction tube. Subsequently, a quasi exhaust gas containing 1 ppm of dichlorobenzene, 20 ppm of $NO_2$, 180 ppm of NO, 190 ppm of $NH_3$, 10% of $O_2$, and 10% of $H_2O$ was contacted with the catalyst sheets under conditions of a reaction temperature of 230° C. and an areal velocity of 6 m/h as shown in Table 8. As the results, decomposition ratio of dichlorobenzene was 98% and denitrating ratio was 94%. At this time, the ratio of $NH_3/NOx$ was 0.95. (Concentration of NOx at the outlet of the reaction tube is shown below Table 9 on the next page.)

TABLE 8

| Areal velocity AV | 6 m/h |
|---|---|
| Reaction temperature | 230° C. |
| Gas composition | |
| Dichlorobenzene | 1 ppm |
| $NO_2$ | 20 ppm |
| NO | 180 ppm |
| $NH_3$ | 190 ppm |
| $O_2$ | 10% |
| $H_2O$ | 10% |
| $N_2$ | The remainder |

COMPARATIVE EXAMPLE 11

Decomposition ratio of dichlorobenzene and the denitrating ratio were determined in the same method as in the Example 17 with the exception that the amount of $NH_3$ injected in the Example 17 was changed so that the ratio of $NH_3/NOx$ became 1.2 and thus the concentration of NOx at the outlet of the reaction tube became unlimitedly small, for example, less than 1 ppm. As the results, the decomposition ratio of dichlorobenzene was 23% and the denitrating ratio was 99.5%.

The results obtained in Example 17 and Comparative Example 11 are shown in Table 9.

TABLE 9

| Test conditions | Decomposition ratio of chlorobenzene (%) | Denitrating ratio (%) |
|---|---|---|
| Example 17 | 98 | 94 |
| Comparative Example 11 | 23 | 99.5 |

From Table 9, it can be understood that a high activity for decomposing DXNs was obtained in Example 17 by setting the $NH_3/NOx$ ratio to 0.95 so that 1.2 ppm of NOx remained at the outlet of the reaction tube, compared with Comparative Example 11 in which an excess amount of $NH_3$ was added so that almost no NOx remained at the outlet of the reaction tube.

EXAMPLE 18

A catalyst unit was prepared by stacking the same catalyst sheets as in the Example 1 at a distance of 6 mm, an exhaust gas from a refuse incinerator was flown through the catalyst unit such that the space velocity of the gas became 6 m/h, and the reactor was operated at 230° C. for 2000 hours. The exhaust gases at the inlet and outlet of the catalyst unit were sampled at an initial stage and 2000 hours after the start of the operation to determine the decomposition ratios of DXNs. As the results, the decomposition ratio of dioxins was found to be as high as greater than 95% at the initial stage and even 2000 hours after.

In this Example, such an inconvenience as seen in conventional technology in which a catalyst layer becomes a DXNs generator did not occur since the treatment was conducted at a temperature lower than the temperature region at which DNXs are re-synthesized.

COMPARATIVE EXAMPLE 12

Catalyst sheets were prepared by the same methods as in the Example 1 with the exception that ammonium paratungstate was used in place of ammonium molybdate; the catalyst sheets thus obtained were stacked in the same way as in the Example 18 at a distance of 6 mm to form a catalyst unit, and the decomposition ratios of dioxins were determined in the same manner as in the Example 18. As the results, it was found that whereas the initial decomposition ratio of dioxins was as high as greater than 85%, it decreased to lower than 40% after 2000 hours elapsed.

EXAMPLE 19

Water was added to a mixture of ammonium metavanadate, ammonium molybdate, and powders of a titanium oxide, and kneaded with a kneader to prepare a paste of a catalyst having a chemical composition of Ti/Mo/V=88/5/7 in terms of atomic ratio. On the other hand, net-like products prepared by plain weaving twisted yarns each comprising 1400 E-glass fibers having a diameter of 9 $\mu$m at a roughness of 10 yarns/25.4 mm were impregnated with a slurry containing a titania, silica sol, and polyvinyl alcohol to impart a stiffness thereby obtaining catalyst substrates. The catalyst paste described above was placed between two sheets of the catalyst substrates obtained by the procedures described above, and they were passed through pressure rolls, subjected to an air-drying in an atmosphere for 12 hours, and then calcined at 500° C. for 2 hours to obtain a platelike catalyst (100 mm×100 mm) having a thickness of 1.0 mm.

The catalyst thus obtained was cut into test pieces of 20 mm×100 mm. Three sheets of the test pieces were impregnated with a solution in which dichlorobenzene (DCB) was dissolved as a quasi dioxin substance in methanol so that the amount of DCB to be supported by the three catalyst test pieces became 0.001 mol in total. The test pieces which supported DCB were subjected to an air-drying in an atmosphere for 12 hours, and filled in a reaction tube. Subsequently, such a gas containing 100 ppm of $NO_2$, 10% of $O_2$, and 10% of $H_2O$ as shown in Table 10 was flown through the test pieces at 150° C. at an areal velocity of 10 m/h for 90 minutes, the concentrations of CO, $CO_2$, and NO in the gas which passed through the catalyst test pieces were determined by various type of monitors, the DCB eliminated was measured by FID (flame ionization detector), and the decomposition ratio of DCB was calculated from the values of CO and $CO_2$. As a result, it was found that DCB decomposition ratio was 63% 30 minutes after the gas was started to flow. The conversion of $NO_2$ into NO was calculated from the detected value of NO to be 52% 10 minutes after the gas was started to flow. Further, the residual ratio of DCB which is supposed to be remaining in the catalyst was calculated based on the detected values of CO, $CO_2$, and DCB to be 55% 30 minutes after the gas was started to flow, 7% 60 minutes after, and 0% 90 minutes after.

| Test conditions for decomposing dichlorobenzene | |
|---|---|
| Areal velocity | 10 m/h |
| Reaction Temperature | 150° C. |
| Gas composition | |
| $NO_2$ | 100 ppm |
| $O_2$ | 10% |
| $H_2O$ | 10% |
| $N_2$ | The remainder |

COMPARATIVE EXAMPLE 13

The same test as in the Example 19 was conducted under the same conditions as those in the Example 19 by using the same mixed gas as shown in Table 10 with the exception that $NO_2$ was excluded. As the results, it was found that DCB decomposition ratio was 11% 30 minutes after the gas was started to flow, $NO_2$ conversion was 19% 10 minutes after the gas was started to flow, and DCB residual ratio was 86% 30 minutes after, 70% 60 minutes after, and 53% 90 minutes after the gas was started to flow, respectively.

The same test as in the Example 19 was conducted under the same conditions as those in the Example 19 with the exception that the catalyst once employed in the test of the Comparative Example 13 was used again as catalyst test pieces. As the results, it was found that DCB decomposition ratio was 66% 30 minutes after the gas was started to flow, $NO_2$ conversion was 50% 10 minutes after the gas was started to flow, and DCB residual ratio was 11% 30 minutes after, 0% 60 minutes after, and also 0% 90 minutes after the gas was started to flow respectively.

COMPARATIVE EXAMPLE 14

The same test as in the Comparative Example 13 was conducted in the same method as in the Comparative Example 13 with the exception that a catalyst which was prepared and contacted with a gas containing DCB to adhere the DCB thereto in the same method as in the Example 19, air-dried in an atmosphere for 12 hours, and then washed with water in an amount of 10 times as much as the weight of the catalyst was used as catalyst test pieces. As the results, it was found that DCB decomposition ratio was 2% 30 minutes after the gas was started to flow, $NO_2$ conversion was 19% 10 minutes after the gas was started to flow, and DCB residual ration was 89% 30 minutes after, 79% 60 minutes after, and 70% 90 minutes after the gas was started to flow, respectively.

EXAMPLE 21

The same test as that in the Example 19 was conducted in the same method as in the Example 19 with the exception that the catalyst once employed in the test of the Comparative Example 14 was used again as catalyst test pieces. As the results, it was found that DCB decomposition ratio was 59% 30 minutes after the gas was started to flow, $NO_2$ conversion was 42% 10 minutes after the gas was started to flow, and DCB residual ratio was 45% 30 minutes after, 37% 60 minutes after, and 37% 90 minutes after the gas was started to flow, respectively.

EXAMPLE 22

Catalyst test pieces having a chemical composition of Ti/W/V of 88/5/7 in terms of atomic ratio were prepared by the same method as in the Example 19 with the exception that ammonium molybdate which is a raw material for the catalyst was changed to ammonium tungstate, and the same test as in the Example 19 was conducted in the same method as in the Example 19 with the exception that the catalyst was changed. As the results, it was found that DCB decomposition ratio was 42% 30 minutes after the gas was started to flow, $NO_2$ conversion was 46% 10 minutes after the gas was started to flow, and DCB residual ratio was 66% 30 minutes after, 28% 60 minutes after, and 0% 90 minutes after the gas was started to flow, respectively.

COMPARATIVE EXAMPLE 15

The same test as in the Comparative Example 13 was conducted in the same method as in the Comparative Example 13 with the exception that the same catalyst as prepared in the Example 22 was used as catalyst test pieces. As the results, it was found that DCB decomposition ratio was 7% 30 minutes after the gas was started to flow, $NO_2$ conversion was 20% 10 minutes after the gas was started to flow, and DCB residual ratio was 84% 30 minutes after, 71% 60 minutes after, and 53% 90 minutes after the gas was started to flow, respectively.

Results of the DCB decomposition ratios and $NO_2$ conversions in Examples 13 to 16 and Comparative Examples 19 to 22 are collectively shown in Table 11, and the results of determination of DCB residual ratios in the Examples and Comparative Examples are collectively shown in Table 12, respectively.

TABLE 11

|  | DCB decomposition ratio (%) 30 min after | $NO_2$ conversion (%) 10 min after |
| --- | --- | --- |
| Example 19 | 63 | 52 |
| Example 20 | 66 | 50 |
| Example 21 | 59 | 42 |
| Example 22 | 42 | 46 |
| Comparative Example 13 | 11 | 19 |
| Comparative Example 14 | 2 | 19 |
| Comparative Example 15 | 7 | 20 |

TABLE 12

|  | DCB residual ratio (%) | | |
| --- | --- | --- | --- |
|  | 30 min after | 60 min after | 90 min after |
| Example 19 | 55 | 7 | 0 |
| Example 20 | 11 | 0 | 0 |
| Example 21 | 45 | 37 | 37 |
| Example 22 | 66 | 28 | 0 |
| Comparative Example 13 | 86 | 70 | 53 |
| Comparative Example 14 | 89 | 79 | 70 |
| Comparative Example 15 | 84 | 71 | 53 |

From Table 11, it can be understood that in Examples 19 to 22 in which the catalysts were treated with a gas containing $NO_2$, high DCB decomposition ratios were obtained, $NO_2$ conversions were high, and the decomposition reactions (equation (4)) of DCB with $NO_2$ rapidly proceeded compared with Comparative Examples 13 to 15 in which the catalysts were treated with a gas containing no $NO_2$.

From Table 12, it can be understood that DCB was completely removed 90 minutes after the tests were started in Examples 19, 20, and 22. Although DCB residual ratio was 37% 90 minutes after in Example 21 in which catalyst test pieces after subjected to washing with water were used, the reason for such result is considered to be that a part of DCB was removed by the washing of the catalyst with water prior to the start of the test, on the other hand, the DCB decomposition ratio was determined with CO and $CO_2$ formed at the time of the decomposition of DCB being indexes, and thus the part of the DCB removed by the washing was, mathematically assumed to have remained in or on the catalyst. This inference can be considered to be correct since the DCB residual ratios both 60 minutes after and 90 minutes after the start of the test are in agreement at 37%.

Also, from the comparison between Example 19 and Example 22 in Table 12, it can be understood that the decomposition rate of DCB in Example 19 is higher than that in Example 16, and thus a catalyst comprising oxide complex of three components of titanium, molybdenum, and vanadium is more appropriate as a catalyst for decomposing DXNs when the treatment of used catalysts are taken into account.

INDUSTRIAL APPLICABILITY

According to the invention recited in claim 1 of the present application (hereinafter the words "of the present application" are omitted for brevity), it is possible to oxidatively decompose toxic or poisonous chlorine containing organic compounds (DXNs) contained in an exhaust gas from a refuse incinerator and the like, efficiently with nitrogen dioxide while using a small amount of a catalyst even at a lower temperature, and the re-synthesis of DXNs can be avoided.

According to the invention recited in claim 2, it is possible to oxidatively decompose the DXNs efficiently while using a small amount of a catalyst at a lower temperature as in the case of claim 1 by using a specific catalyst.

According to the invention recited in claim 3, the same effects as produced by the invention of claim 1 or 2 are obtained, and additionally, the DXNs contained in an exhaust gas can oxidatively be decomposed with $NO_2$ at a high efficiency even at a low temperature region without reducing the activity of a catalyst even in the co-presence of $SO_2$.

According to the invention recited in claim 4, it is possible to oxidatively decompose chlorine containing organic compounds contained in an exhaust gas with nitrogen dioxide while using a small amount of a catalyst at a lower temperature region and to decompose and remove nitrogen oxides. Also, the invention of claim 4 is free from worries that DXNs are re-synthesized.

According to the invention recited in claim 5, the same effects as the invention of claim 4 are obtained.

According to the invention recited in claim 6, the same effects as the invention of claim 4 or 5 are obtained, and additionally, the DXNs and NOx contained in an exhaust gas can be oxidatively decomposed and removed at a high efficiency, respectively, without lowering of the activity of a catalyst even in the co-presence of $SO_2$.

According to the invention recited in claim 7, a catalyst excellent in the activity of decomposing DXNs with $NO_2$ can be obtained due to combined actions of three components of Ti, Mo, and V in the catalyst. Thus, it is possible to further lower the reaction temperature and to devise a plan to reduce a necessary amount of a catalyst. Also, according to the invention of claim 7, a catalyst which is excellent in resistance to SOx and exhibits an activity of decomposing the DXNs stably for a long period of time can be provided.

According to the invention recited in claim 8, it is possible to secure a safe work area in an internal work including periodical inspections and the handling of a used catalyst at the time of discarding or exchanging the catalyst becomes easy since the DXNs remaining in or on the used catalyst can efficiently be removed.

According to the invention recited in claim 9, the same effects as produced by the invention of claim 8 can be obtained, and additionally, re-synthesis of decomposed DXNs can be prevented.

According to the invention recited in claim 10, the DXNs remaining in or on a used catalyst can efficiently be decomposed and removed as in the case of the invention of claim 8 or 9.

According to the invention recited in claim 11, the same effects as the invention of claim 10 can be obtained, and additionally, the DXNs remaining in a waste water produced at the time of removing dusts can efficiently be decomposed and removed, and further treatments of the waste water become unnecessary.

According to the invention of claim 12, the same effects as the invention of one of claims 8 to 11 can be obtained, and additionally, the use of a specific treating apparatus becomes unnecessary.

According to the invention of claim 13, a treatment for making a used catalyst innoxious can more rapidly be performed by using a specific catalyst as catalyst for decomposing the DXNs.

What is claimed is:

1. A method for decomposing a chlorine containing organic compound contained in an exhaust gas comprising reacting the chlorine containing organic compound contained in the exhaust gas with nitrogen dioxide which is contained in the exhaust gas or added from the outside into the exhaust gas at 100 to 450° C. in the presence of a catalyst such that the concentration of nitrogen dioxide in the exhaust gas after the termination of the reaction is higher than 1 ppm, to oxidatively decompose the chlorine containing organic compound with the nitrogen dioxide.

2. The method for decomposing a chlorine containing organic compound contained in an exhaust gas according to claim 1 wherein the catalyst comprises a titanium oxide, molybdenum oxide, and vanadium oxide, the contents of titanium (Ti), molybdenum (Mo), and vanadium (V) in the catalyst being in the range of 99 to 70/0.5 to 15/0.5 to 15 in terms of atomic ratio, respectively.

3. The method for decomposing a chlorine containing organic compound contained in an exhaust gas according to claim 1 or 2 wherein the exhaust gas contains a sulfur oxide.

4. A method for decomposing a chlorine containing organic compound contained in an exhaust gas comprising introducing ammonia into the exhaust gas containing the chlorine containing organic compound and then contacting the exhaust gas with a catalyst comprising a titanium oxide, molybdenum oxide, and vanadium oxide the contents of titanium (Ti), molybdenum (Mo), and vanadium (V) in which catalyst being in the range of 99 to 70/0.5 to 15/0.5 to 15 in terms of atomic ratio, respectively, at 100 to 450° C. to oxidatively decompose the chlorine containing organic compound with nitrogen dioxide which is contained-in-the exhaust gas or added from the outside into the exhaust gas and concentration of which nitrogen dioxide is higher than that of the chlorine containing organic compound, and to decompose the nitrogen oxide with the ammonia such that the nitrogen oxide remains at a concentration of higher than 1 ppm.

5. The method for decomposing a chlorine containing organic compound contained in an exhaust gas according to claim 4 wherein a part of the reaction for decomposing the nitrogen oxide with the ammonia is carried out in advance before the exhaust gas is contacted with the catalyst.

6. The method for decomposing a chlorine containing organic compound contained in an exhaust gas according to claim 4 or 5 wherein the exhaust gas contains a sulfur oxide.

* * * * *